United States Patent
Tamura

(10) Patent No.: US 6,817,172 B2
(45) Date of Patent: Nov. 16, 2004

(54) EXHAUST PURIFYING APPARATUS FOR AN INTERNAL COMBUSTION ENGINE AND A FAILURE PREVENTION METHOD THEREFOR

(75) Inventor: Yasuki Tamura, Nisshin (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/601,580

(22) Filed: Jun. 24, 2003

(65) Prior Publication Data

US 2004/0000138 A1 Jan. 1, 2004

(30) Foreign Application Priority Data

Jun. 26, 2002 (JP) ........................................ 2002-186165

(51) Int. Cl.[7] ................................................ F01N 3/00
(52) U.S. Cl. ............................ 60/285; 60/274; 60/286; 60/292; 60/324; 123/198 F; 123/481
(58) Field of Search .......................... 60/274, 285, 286, 60/287, 288, 291, 292, 324; 123/198 F, 481; 137/115.13, 115.26, 494

(56) References Cited

U.S. PATENT DOCUMENTS

| | | | | |
|---|---|---|---|---|
| 5,195,318 A | * | 3/1993 | Shinzawa et al. ............. | 60/285 |
| 5,410,875 A | * | 5/1995 | Tanaka et al. ................ | 60/288 |
| 5,845,486 A | * | 12/1998 | Yamashita et al. ............ | 60/274 |
| 6,109,027 A | * | 8/2000 | Schaefer ...................... | 60/324 |
| 6,729,123 B2 | * | 5/2004 | Tamura et al. ................ | 60/285 |

FOREIGN PATENT DOCUMENTS

JP          2001-59428 A          3/2001

* cited by examiner

Primary Examiner—Binh Q. Tran
(74) Attorney, Agent, or Firm—Birch, Stewart, Kolasch & Birch, LLP

(57) ABSTRACT

An exhaust purifying apparatus includes an exhaust throttle valve provided in an exhaust passage of the internal combustion engine for closing the exhaust passage to increase a pressure therein; a relief passage provided bypassing the exhaust throttle valve; a relief valve provided to be able to close the relief passage and to be open when receiving an increased pressure in the exhaust passage with closure of the exhaust throttle valve; fuel cut determining means for determining whether the engine is during fuel cut-off; and a relief-valve forcibly operating means for closing the exhaust throttle valve when the fuel cut determining means determines that the engine is during fuel cut-off, thereby removing condensed water accumulated in the relief passage to avoid faulty operations of the relief valve, and suppressing deteriorated fuel consumption upon operation of the relief valve.

12 Claims, 4 Drawing Sheets

EXHAUST PURIFYING APPARATUS FOR AN INTERNAL COMBUSTION ENGINE AND A FAILURE PREVENTION METHOD THEREFOR

CROSS REFERENCE TO RELATED APPLICATION

This non-provisional application incorporates by reference the subject mater of Patent Application No. 2002-186165 filed in Japan on Jun. 26, 2002, on which a priority claim is based under 35 U.S.C. §119(a).

BACKGROUND OF THE INVENTION (1) Field of the Invention

The present invention relates to an exhaust purifying apparatus for controlling the exhaust flow of an internal combustion engine by using an exhaust throttle valve provided in an exhaust passage of the engine, and relates to a failure prevention method for an exhaust purifying apparatus.

(2) Description of the Related Art

To reduce harmful substance emission and achieve early catalyst activation, there have been proposed technical arts, which control the exhaust flow of an internal combustion engine to promote reaction between unburned fuel components and oxygen ($O_2$) in an exhaust system (from combustion chambers to an exhaust pipe) of the engine. For in-cylinder injection type engines, it has been found that noticeable effects can be attained by using the just-mentioned arts in combination with 2-stage combustion for performing sub-injection in addition to main injection, or a compression slight lean operation for making fuel injection in a compression stroke at a slightly lean air/fuel ratio, or secondary air supply, etc.

For a method of controlling the engine's exhaust flow, an exhaust throttle valve is sometimes provided in the exhaust passage. With such a method, however, when attempting to control the exhaust flow in various engine operating conditions that are different in exhaust flow rate or exhaust temperature from one another, the exhaust pressure (i.e., the pressure in the exhaust passage) greatly varies if the throttle opening remains constant, resulting in an unstable reaction in the exhaust system. In addition, degraded fuel consumption, deteriorated combustion, etc. may be caused by an excessively increased exhaust pressure. Therefore, in order to attain the desired exhaust pressure, usually the exhaust throttle valve is used in combination with a relief valve.

By way of example, in a technical art disclosed in JP-A-2001-59428, a relief valve is provided in a relief passage that bypasses an exhaust throttle valve. In this technical art, the exhaust throttle valve is fully closed at the engine's cold start for the purpose of reducing cold start emissions of unburned HC, and the relief valve opens when the exhaust pressure increases to reach a preset pressure of the relief valve, whereby the exhaust pressure is kept at the preset pressure.

Since the relief valve is usually kept closed, however, a dead-end alley is formed in the relief passage at the location of the relief valve. This allows moisture content of the exhaust gas to accumulate there, as condensed water, which contains various exhaust gas components such as Fe, Ni, S, etc. These components, as contaminants, adhere to sliding parts of the relief valve, etc., to increase sliding resistance thereof. In particular, sulfur components accumulated in an NOx catalyst have strong acidity to cause corrosion, thus largely affecting the sliding parts. This poses a problem that the relief valve is hindered from operating normally.

As a countermeasure for this, the exhaust throttle valve may be closed at regular intervals to increase the exhaust pressure, thus causing the relief valve to operate (open) so as to permit condensed water accumulated in the dead-end alley of the relief passage to be discharged therefrom, thereby removing contaminants adhered to the sliding parts, etc., together with the condensed water. However, the closure of the exhaust throttle valve can increase the engine's exhaust resistance, posing another problem of deteriorated fuel consumption, and hence preventive measures therefor have been desired.

SUMMARY OF THE INVENTION

An object of the present invention is to provide an exhaust purifying apparatus for an internal combustion engine capable of operating a relief valve to discharge condensed water accumulated in a relief passage therefrom, thus avoiding faulty operation of the relief valve attributable to contaminants contained in the condensed water, and capable of suppressing deteriorated fuel consumption caused by increased exhaust resistance upon operation of the relief valve.

Another object of the present invention is to provide a failure prevention method for an exhaust purifying apparatus of an internal combustion engine that is capable of avoiding faulty operation of a relief valve without making fuel consumption deteriorated.

According to one aspect of this invention, there is provided an exhaust purifying apparatus of an internal combustion engine, which comprises: an exhaust throttle valve provided in an exhaust passage of the internal combustion engine, so as to be able to be closed to close the exhaust passage; a relief passage provided communicating with the exhaust passage and bypassing the exhaust throttle valve; a relief valve provided in the relief passage so as to be able to be closed to close the relief passage, and arranged to be opened to open the relief passage when receiving an increased pressure in the exhaust passage that is closed with closure of the exhaust throttle valve; fuel cut determining means for determining whether the internal combustion engine is during fuel cut-off; and a relief-valve forcibly operating means for closing the exhaust throttle valve to open the relief valve when it is determined by the fuel cut determining means that the internal combustion engine is during fuel cut-off.

According to another aspect of the present invention, there is provided an exhaust purifying apparatus of an internal combustion engine, which comprises: an exhaust throttle valve provided in an exhaust passage of the internal combustion engine, so as to be able to be closed to close the exhaust passage; a relief passage provided communicating with the exhaust passage and bypassing the exhaust throttle valve; a relief valve provided in the relief passage so as to be able to be closed to close the relief passage, and arranged to be opened to open the relief passage when receiving an increased pressure in the exhaust passage that is closed with closure of the exhaust throttle valve; deceleration determining means for determining whether the internal combustion engine is during deceleration; and a relief-valve forcibly operating means for closing the exhaust throttle valve to open the relief valve when it is determined by the deceleration determining means that the internal combustion engine is during deceleration.

According to still another aspect of the present invention, there is provided a failure prevention method for an exhaust purifying apparatus of an internal combustion engine, which comprises the steps of: (a) determining whether or not the internal combustion engine is during fuel cut-off or deceleration; and (b) closing an exhaust throttle valve so as to cause a relief valve to open when it is determined at the step (a) that the internal combustion engine is during fuel cut-off or deceleration, the exhaust throttle valve being provided in an exhaust passage of the internal combustion engine, for closing the exhaust passage to increase a pressure in the exhaust passage, and the relief valve being provided to be able to close a relief passage that is provided communicating with the exhaust passage and bypassing the exhaust throttle valve.

Moisture content of exhaust gas is accumulated, as condensed water, at a location of the relief valve in the relief passage, and condensed water components, as contaminants, are gradually adhered to the relief valve. On the other hand, the exhaust throttle valve is caused to be closed by the relief-valve forcibly operating means, and the resultant increased pressure in the exhaust passage causes the relief valve to open, so that the contaminants adhered to the relief valve are removed, together with the condensed water that is discharged from the relief passage. Thus, faulty operation of the relief valve can be avoided. Since the closing of the exhaust throttle valve is carried out when the internal combustion engine is during fuel cut-off or during deceleration, the closure of the exhaust throttle valve hardly results in degraded fuel consumption though it makes engine's exhaust resistance increase.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF THE INVENTION

The present invention will be described in detail with reference to the accompanying drawings showing preferred embodiments thereof. It is to be understood, however, that the dimensions, materials, shapes, and arrangements of components parts should not be restricted to the following embodiments, but changes within the purviews of the appended claims may be made without departing from the true scope.

Figure 1:
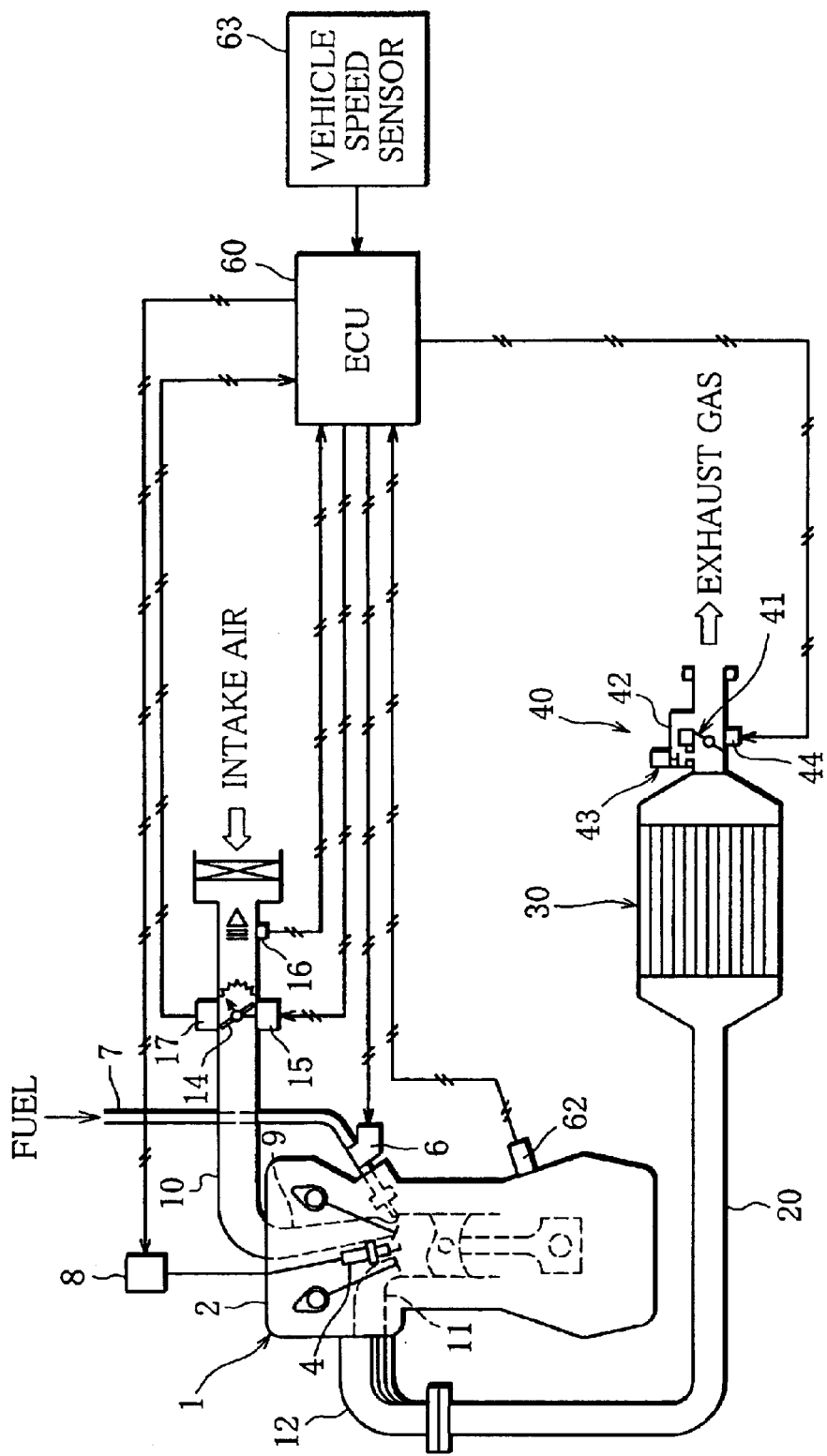
FIG. 1 is a schematic view showing the construction of an exhaust purifying apparatus for an internal combustion engine, according to an embodiment of the present invention.

With reference to FIG. 1, an exhaust purifying apparatus, according to an embodiment of this invention, for a vehicle-mounted internal combustion engine will be explained. In FIG. 1, reference numeral 1 designates an engine body (hereinafter referred to simply as engine), serving as an internal combustion engine, which is comprised of an in-cylinder injection type spark ignition gasoline engine, for instance, in which a fuel injection mode can be switched to perform fuel injection either in intake stroke or in compression stroke (intake stroke injection or compression stroke injection).

With the fuel-injection mode switching and an air/fuel ratio control, the in-cylinder injection type engine 1 easily operates not only at theoretical (stoichiometric) and rich air/fuel ratios for stoichiometric and rich air/fuel ratio operations, but also at a lean air/fuel ratio for lean air/fuel ratio operation. In the in-cylinder injection type engine 1, moreover, a 2-stage combustion mode can be selected for a 2-stage combustion operation in which main fuel injection for main combustion is made in compression stroke and, in addition, sub-fuel injection is performed in or after expansion stroke.

Together with ignition plugs 4, electromagnetic fuel injection valves 6 for individual cylinders are mounted on a cylinder head 2 of the engine 1, so as to permit fuel to be injected directly into combustion chambers. Ignition coils 8 for generating a high voltage are connected individually to the ignition plugs 4. A fuel supply system (not shown) is connected through fuel pipes 7 to the fuel injection valves 6, which system includes a low-pressure fuel pump, a high-pressure fuel pump, and a fuel tank.

The cylinder head 2 is formed with intake ports 9 for individual cylinders, which ports extend substantially in an upright direction. An intake manifold 10 is connected at opposite ends with the intake ports 9 and an intake pipe for communication therewith. In the intake pipe, there are provided a throttle valve 14 driven by a motor 15 for adjusting the amount of intake air, a throttle sensor 17 for detecting the opening TPS (FIG. 4) of the throttle valve 14, and an intake air amount sensor 16 for detecting the amount of intake air. As the intake air amount sensor 16, a Karman's vortex type air flow sensor is adopted, for instance.

The cylinder head 2 is formed with exhaust ports 11 for individual cylinders, which ports extend substantially in a horizontal direction and to which an exhaust manifold 12 is connected at its one end so as to be communicated therewith. In this embodiment, a dual exhaust manifold system is adopted as the exhaust manifold 12. Alternatively, the exhaust manifold 12 may be comprised of a single exhaust manifold system or a clamshell exhaust manifold system.

Since the in-cylinder injection type engine 1 is already known, detailed explanations thereof will be omitted. An exhaust pipe (exhaust passage) 20 is connected to another end of the exhaust manifold 12, and a three-way catalyst (catalytic converter) 30 is provided in the exhaust pipe 20. The three-way catalyst 30 is comprised of a carrier on which one or more active noble metals are carried that are selected from a group consisting of copper (Cu), cobalt (Co), silver (Ag), platinum (Pt), rhodium (Rh), and palladium (Pd).

Figure 2:
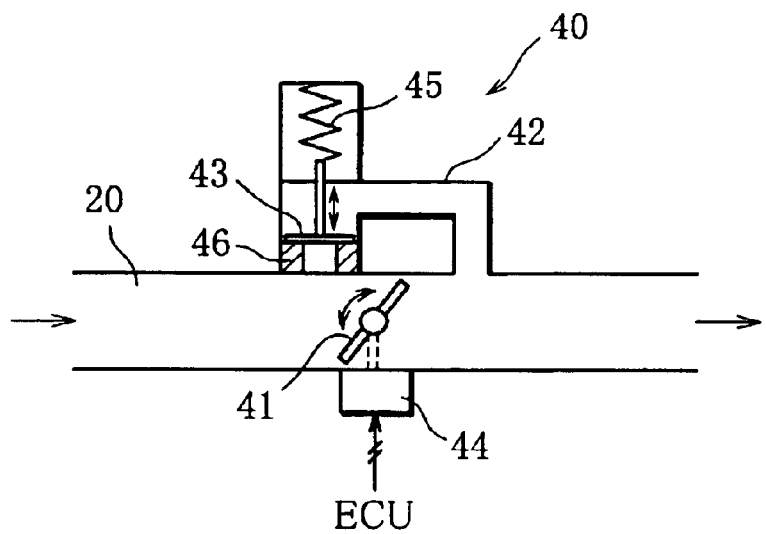
FIG. 2 is an enlarged fragmentary view showing in detail an exhaust flow controller of the exhaust purifying apparatus.

An exhaust flow controller 40 is provided in the exhaust pipe 20 at a location downstream of the three-way catalyst 30. The exhaust flow controller 40 serves to suppress the exhaust flow for the purpose of reducing emission of harmful substances (unburned HC, unburned CO, NOx, smoke, $H_2$, etc.) contained in exhaust gas and of achieving an earlier activation of the three-way catalyst 30. Referring to FIG. 2 showing the exhaust flow controller 40 in detail, the exhaust flow controller 40 is comprised of a butterfly exhaust throttle valve 41, a relief passage 42, and a poppet relief valve 43. The exhaust throttle valve 41 is provided in the exhaust pipe 20, and is rotatably driven by an actuator 44 between two positions, i.e., a fully opened position and a fully closed position, for opening and closing the exhaust pipe 20. The relief passage 42 is provided communicating with the exhaust pipe 20 and bypassing the exhaust throttle valve 41, and the relief valve 43 is provided in the relief passage 42. By means of an urging force of a relief spring 45, the relief valve 43 is caused to abut against a valve seat 46, to be kept closed, thereby closing the relief passage 42. On the other hand, when the exhaust pressure, i.e., the pressure in the exhaust pipe 20, observed at a location upstream of the exhaust valve 41 increases to reach a preset pressure of the relief spring 45, the relief valve 43 opens, so that the exhaust gas in an upstream portion of the exhaust pipe 20 with respect to the exhaust throttle valve 41 flows into a downstream portion of the exhaust pipe 20 through the relief passage 42, resulting in a decrease in the exhaust pressure in the upstream portion of the exhaust pipe 20. When the pressure decreases to below the preset pressure, the relief valve 43 is closed to close the relief passage 42, thus preventing the exhaust gas from entering the downstream portion of the exhaust pipe 20 through the relief passage 42. In this manner, the pressure in the exhaust pipe 20 on the side upstream of the exhaust throttle valve 41 is kept maintained at or below the preset pressure by the opening and closing of the relief valve 43.

An ECU (electronic control unit) 60 includes input/output devices, memory devices (ROMs, RAMs, nonvolatile RAMs, etc.), a central processing unit (CPU), timer counters, and the like. The ECU 60 serves to perform overall control of the exhaust purifying apparatus and the engine 1. The ECU 60 is connected at its input side with various sensors to receive pieces of detection information from these sensors, which include the intake air amount sensor 16, the throttle position sensor 17, a crank angle sensor 62 for detecting the crank angle of the engine 1, a vehicle speed sensor 63 for detecting the vehicle speed V (FIG. 4), and an accelerator opening sensor (not shown) for detecting the degree of accelerator opening. On the basis of crank angle information supplied from the crank angle sensor 62, the engine rotation speed is detected.

The ECU 60 is connected at its output side with various devices including the fuel injection valves 6, the ignition coils 8, the motor 15 for the throttle valve 14, and the actuator 44 for the exhaust throttle valve 41. Based on a fuel injection mode and a target air/fuel ratio that are determined from pieces of detected information supplied from the sensors, the ECU 60 sets target values of a fuel injection amount, injection timing, ignition timing, throttle opening degree, etc. In accordance with these target values, the ECU 60 controls the drive of the fuel injection valves 6, the ignition coils 8, and the motor 15.

At the cold start of the engine 1, for instance, the ECU 60 carries out fuel injection in a 2-stage combustion mode and suppresses the exhaust flow by means of the exhaust flow controller 40 to achieve an earlier activation of the three-way catalyst 30. More specifically, the ECU 60 performs a main injection in compression stroke for main combustion, and then performs a sub-injection in or after expansion stroke so as to cause unburned fuel components (HC, etc.) produced by the sub-injection to react with the residual $O_2$ remaining after the main combustion. On the other hand, the ECU 60 operates the actuator 44 to fully close the exhaust throttle valve 41, thereby increasing the exhaust pressure in the exhaust pipe 20. When the exhaust pressure increases to the preset pressure of the relief valve 43, the relive valve 43 opens. Thus, the exhaust pressure increases to and remains at the preset pressure. This pressure increase and accompanying effects such as an increased exhaust density, an increased dwell time of exhaust gas in the catalyst 30, a reverse flow of exhaust gas into combustion chambers, etc., promote the reaction between $O_2$ and unburned fuel components, and the resulting reaction heat contributes to an earlier activation of the three-way catalyst 30.

Figure 3:
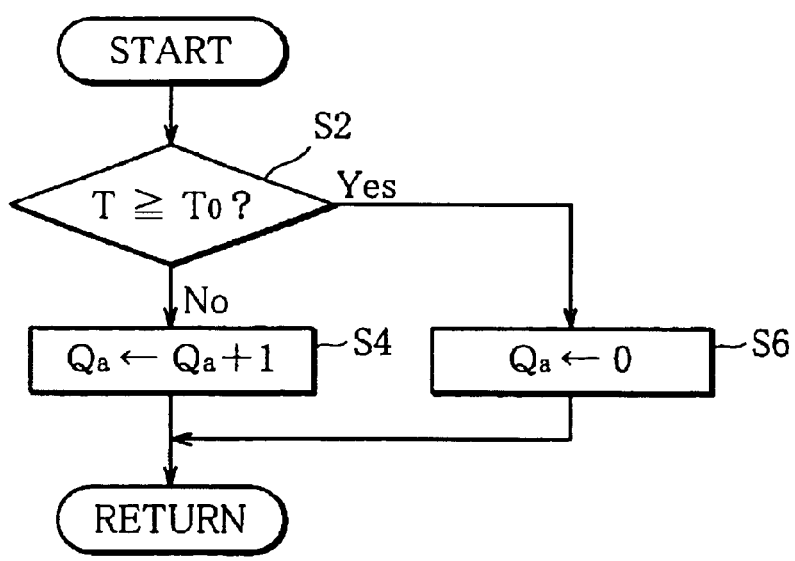
FIG. 3 is a flowchart showing a contaminant adhesion amount estimating routine executed by an ECU shown in FIG. 1.

To remove condensed water that is accumulated in the relief passage 42 at a location of the relief valve 43, the ECU 60 carries out a control for closing the exhaust throttle valve 41 at regular intervals, thereby making the relief valve 43 open. In the following, processes therefor executed by the ECU 60 will be explained in detail. The ECU 60, serving as adhesion-amount-related value estimating means, carries out a contaminant adhesion amount estimating routine shown in FIG. 3 at predetermined control intervals. First, the ECU 60 determines whether or not a closing time period T of the exhaust throttle valve 41 reaches a predetermined time period T0, at step S2. As the closing time period T, an accumulated value is used that represents a time period during which the exhaust throttle valve 41 is in a closed state and which starts when condensed water in the relief passage 42 may be regarded as being completely removed therefrom (i.e., when an adhesion-amount-related value Qa, mentioned later, is reset to zero).

To determine the accumulated value (T), a timer routine (not shown), for instance, is executed at intervals of a predetermined cycle. By way of example, in the timer routine, a determination is made as to whether or not the accumulated value (T) is equal to or larger than a predetermined value corresponding to the predetermined time period T0, and if the determination result is affirmative, the accumulated value (T) is reset to zero, whereas the accumulated value (T) is kept unchanged if the determination result is negative, i.e., if the accumulated value (T) is less that the predetermined value. Next, a determination is made as to whether or not the exhaust throttle valve 41 is in a closed state. If the determination result is affirmative, the accumulated value (T) is incremented, whereas the value (T) is kept unchanged if the determination result is negative, i.e., if it is determined that the exhaust throttle valve 41 is in an open state. Whereupon, the processing at the present cycle is finished. The accumulated value (T) and the adhesion-amount-related value Qa are reset to zero when condensed water is regarded as being fully removed from the relief passage 42. Thereafter, the exhaust throttle valve 41 is generally intermittently closed, and the accumulated value (T) is incremented in every cycle of the timer routine if the throttle valve is in a closed state.

The accumulated value (T) may be used as the closing time T in a case where the closing of the exhaust throttle valve 41 is made for the purpose of achieving an earlier activation of the three-way catalyst 30, other than the just-mentioned case where the exhaust throttle valve 41 is closed for the purpose of removing the condensed water. As the predetermined time period T0, a time period (e.g., 10 sec) is set, which is considered to be long enough for condensed water to be fully removed through the relief valve 43 that is open.

When the result of determination at step S2 is NO (negative), the ECU 60 counts up the adhesion-amount-related value Qa at step S4, whereas it resets the value Qa to zero at step S6 when the result of determination at step S2 is YES (affirmative), whereupon the routine is completed. In this manner, the adhesion-amount-related value Qa is set as correlating with the amount of contaminants that are adhered to sliding parts of the relief valve 43, etc. The adhesion-amount-related value Qa corresponds to a time elapsing from when the value Qa was reset to zero, in which the engine is in operation. Repeatedly speaking, the adhesion-amount-related value Qa is counted up as long as the closing time period T of the exhaust throttle valve 41 is less than the predetermined time period T0, regarding that contaminant adhesion due to accumulation of condensed water in the relief passage 42 is in progress, whereas the adhesion-amount-related value Qa is reset to zero when the closing time period T reaches the predetermined time period T0, regarding that contaminants have been fully removed together with the discharged condensed water.

Figure 4:
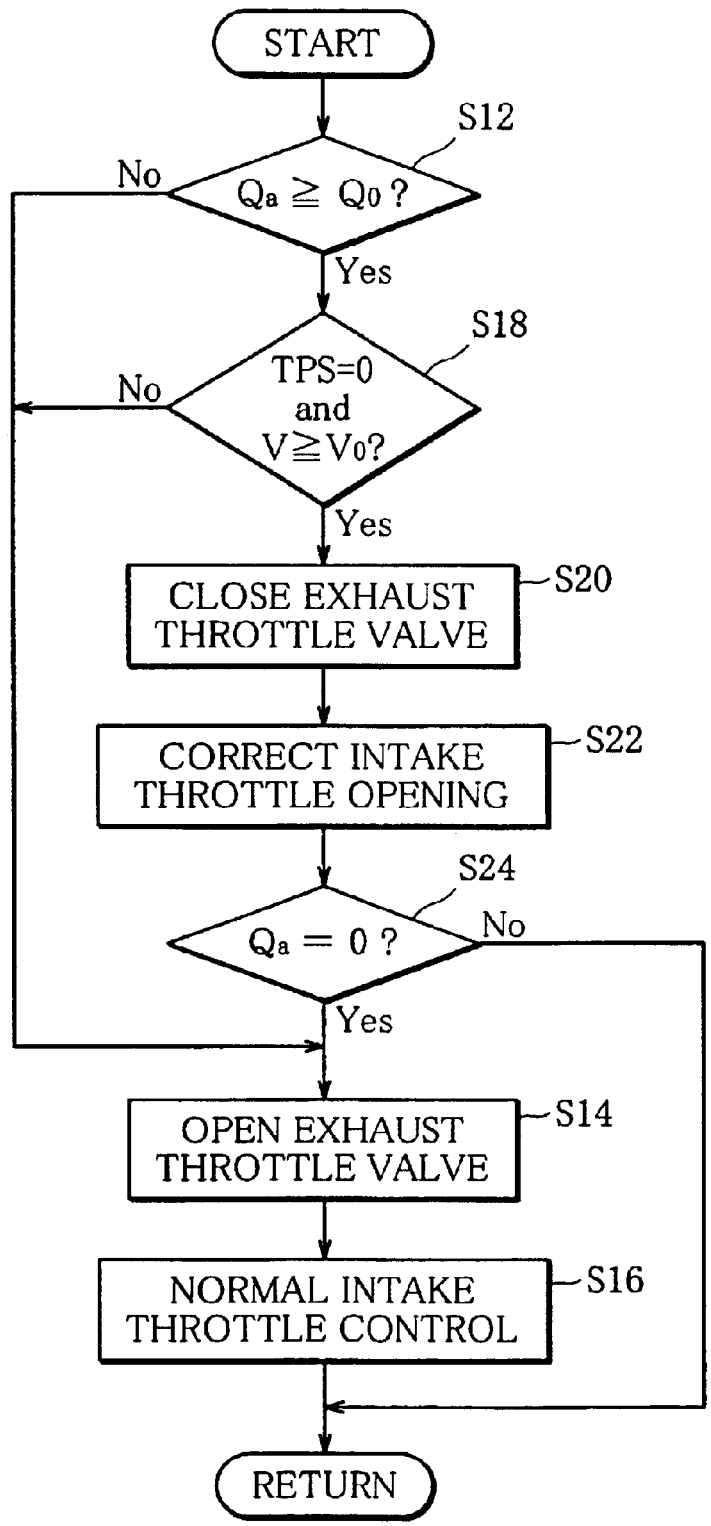
FIG. 4 is a flowchart showing a relief-valve forcibly operating routine executed by the ECU.

The ECU 60 carries out a relief-valve forcibly operating routine shown in FIG. 4 at predetermined control intervals. First, at step S12, the ECU 60 determines whether or not the adhesion-amount-related value Qa reaches a predetermined value Q0. If the result of determination is NO, the control flow advances to step S14 where the ECU 60 keeps the exhaust throttle valve 41 in a fully open state, and, at step S16, carries out a normal throttle opening control based on the accelerator operating amount, etc. Whereupon the routine is completed. In this case, the engine 1 is kept operating in a normal state. Meanwhile, at the cold start of the engine 1, etc., the exhaust throttle valve 41 is fully closed for making an exhaust flow control, irrespectively of the routine shown in FIG. 4.

Referring to FIG. 4, when the result of determination at step S12 is YES, the control flow advances to step S18 where the ECU 60, serving as fuel cut determining means or deceleration determining means, determines whether or not the throttle opening detected by the throttle sensor 17 is at zero (fully closed) and at the same time the vehicle speed V detected by the vehicle speed sensor 63 is not less than a predetermined value V0. These two requirements in the determination serve as conditions for determining whether the engine is during fuel cut-off in deceleration. If the result of determination is NO, the ECU 60 advances to step S14 to keep the engine 1 to operate in a normal state, considering that the engine is not during fuel cut-off in deceleration.

When a fuel cut-off operation starts as a result of vehicle's deceleration, the ECU 60 decides YES in step S18, so that the control flow advances to step S20. At step S20, the ECU 60 serving as relief-valve forcibly operating means causes the exhaust throttle valve 41 to close, and, at subsequent step S22, the ECU 60 serving as intake-air-amount increasing means corrects a target opening degree of the throttle valve 14 to the opening side of the same. At this time, an amount of correction of the target opening degree is set by referring to a predetermined map in accordance with the operating state of the engine 1, so as to correspond to an amount of increase in engine load observed when the exhaust pressure increases to the preset pressure of the relief valve 43.

At subsequent step S24, the ECU 60 determines whether or not the adhesion-amount-related value Qa is at zero. Until the value Qa is reset to zero at step S6 of the contaminant adhesion amount estimating routine, the ECU 60 decides NO at step S24 and repeats the processing in steps S20, S22. On the other hand, when the result of determination at step S24 becomes YES, the ECU 60 advances to step S14 to restore the engine 1 to normal operation.

When a fuel cut-off operation is terminated before the adhesion-amount-related valve Qa is reset to zero at step S6, the ECU 60 advances from step S18 to step S14 to restore the engine 1 to normal operation. Thereafter, when a fuel cut-off operation is started again as a result of the vehicle's deceleration, the ECU 60 advances from step S18 to step S20 to perform the processing in steps S20, S22 again.

With the above-mentioned control by the ECU 60, when the adhesion-amount-related value Qa reaches a predetermined value Q0 and the engine 1 is during fuel cut-off, the exhaust throttle valve 41 is closed so that the relief valve 42 may be opened, whereby condensed water accumulated in a blind alley in the relief passage 42 is discharged therefrom, and contaminants adhered to sliding parts of the relief valve 43, etc. are positively removed together with the condensed water, thus making it possible to avoid faulty operation of the relief valve 43.

To be noted, the opening of the exhaust throttle valve 41 is performed only during fuel cut-off, and therefore, there is no fear of degraded fuel consumption even though the exhaust resistance of the engine 1 increases as a result of the closing of the exhaust throttle valve 41. Thus, without causing wasteful fuel consumption, faulty operation of the relief valve 43 can be avoided as previously mentioned. In addition, since the closing control of the exhaust throttle valve 41 is carried out in accordance with the adhesion-amount-related value Qa which correlates with the amount of adhesion of contaminants to the relief valve 43, the closing of the exhaust throttle valve 41 is controlled at a timing that is suited to a contaminant adhesion state, i.e., the necessity of contaminant removal, thus positively preventing adhesion of contaminants to the relief valve 43 and wasteful closing operations of the exhaust throttle valve 41.

Since a target opening degree of the throttle valve 14 is corrected to the opening side thereof in amount corresponding to the increase in engine load upon closure of the exhaust throttle valve 41, the increase in engine load is mostly canceled by a decrease in pump loss that results from the increased opening of the throttle valve 14. The closing of the exhaust throttle valve 41 is made in the control in accordance with determination results based on the adhesion-amount-related value Qa and the fuel cut-off operation, independently of driver's operations. If there occurs an increase in engine load irrespective of driver's intention, the driver can sensitively feel an unexpected deceleration shock. However, in the embodiment, an abrupt change in engine load is suppressed to prevent the driver's discomfort attributable to a deceleration shock, resulting in improved vehicle's driveability.

As understood from the foregoing explanations, the exhaust purifying apparatus for internal combustion engines according to this embodiment makes it possible to operate the relief valve so as to discharge condensed water accumulated in the relief passage therefrom, thus avoiding faulty operations of the relief valve attributable to the presence of contaminants contained in condensed water, and at the same time makes it possible to suppress deteriorated fuel consumption attributable to the closing of the exhaust throttle valve for operating the relief valve to open.

The present invention is not limited to the embodiment described above, and various modifications may be made therein. For instance, this invention is applied in the embodiment to the exhaust purifying apparatus for the in-cylinder type engine 1, but is applicable to intake-pipe injection type engines and diesel engines. Although the exhaust flow control in the embodiment is applied for the purpose of achieving an earlier activation of the three-way catalyst 30 in the exhaust pipe 20, it may be applied for the purpose of temperature raise for purging substances absorbed by the three-way catalyst 30 or for burning and eliminating particulates collected by a DPF (diesel particulate filter) which is disposed, for instance, in the exhaust pipe 20 at a location downstream of an oxidation catalyst as is known in this field. By way of example, the exhaust throttle valve 41 is closed under the control of the ECU 60, so as to raise the exhaust gas temperature to a purging temperature or a burning temperature, when it is estimated in a known manner that an amount of substances absorbed by the three-way catalyst 30 or an amount of particulates collected by the DPF exceeds an allowable amount.

Figure 5:
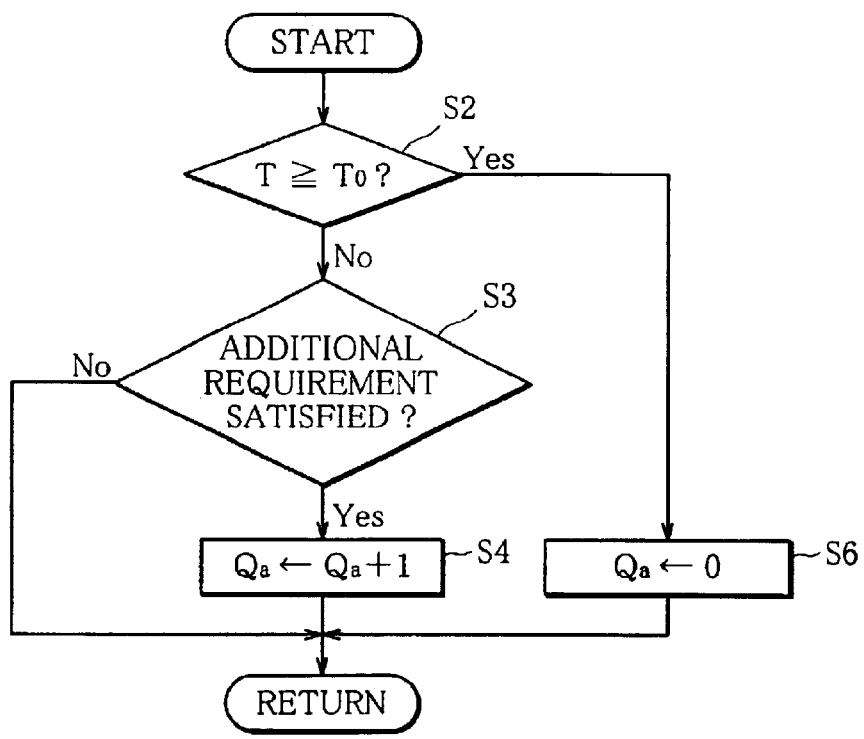
FIG. 5 is a flowchart showing another example of the relief-valve forcibly operating routine.

In the embodiment, when it is determined at step S2 that the closing time period T of the exhaust throttle valve 41 does not reach the predetermined time period T0 as yet, the adhesion-amount-related value Qa is immediately counted up at step S4. Alternatively, as shown by way of example in FIG. 5, step S3 may be added for making a determination as to whether one or more additional requirements in respect of formation of condensed water are fulfilled. More specifically, an exemplified additional requirement at step S3 is that the temperature of exhaust gas entering the exhaust throttle valve 41 is less than a predetermined temperature (e.g., 100 degree centigrade) below which condensed water is produced. The adhesion-amount-related value Qa is counted up at step S4 only when the just-mentioned requirement is satisfied (i.e., when the determination result is YES at step S3) so that it is estimated that condensed water has been produced. In stead of or in combination with that requirement, a further additional requirement may be set such that the condition where the quantity of exhaust flow is less than a predetermined quantity (equivalent to the quantity at idling, for instance) has been continued for a predetermined time period (e.g., 15 minutes). Such consideration on the status of condensed water formation makes it possible to perform a more accurate calculation of the adhesion-amount-related value Qa, whereby a control of the opening of the exhaust throttle valve 41 can be made at a more appropriate timing.

In the embodiment, whether or not the engine is during fuel cut-off is determined based on the throttle opening and vehicle speed V. Alternatively, such determination may be made based on the accelerator opening and vehicle speed V, or on the throttle opening and engine rotation speed, or on the accelerator opening and engine rotation speed, or on pieces of information that are mainly used to generate drive signals for the fuel injection valves 6.

In the embodiment, in accordance with a time period T during which the exhaust throttle valve 41 has been in a closed state after the adhesion-amount-related value Qa, correlating with the adhesion amount of contaminants to sliding parts of the relief valve 43, etc., was reset, the adhesion-amount-related value Qa is determined at step S4, and then at step S12, based on the value Qa, a determination is made as to whether or not the exhaust throttle valve 41 is to be closed. However, such determination may be made based on a quantity of exhaust flow discharged from the engine 1 (or an accumulated value representing the same), a vehicle travel distance, or the like, instead of being based on the adhesion-amount-related value Qa. Specifically, when a quantity of exhaust flow or a vehicle travel distance exceeds a predetermined value, the exhaust throttle valve 41 is closed under the control of the ECU 60.

In the embodiment, the exhaust throttle valve 41 is closed during the deceleration fuel cut-off which is often carried out (except during the exhaust flow control). However, there is a deceleration condition that is accompanied with no fuel cut-off, such as when the engine 1 is in a cold state or when suppression of a thermal deterioration of the catalyst 30 is made. Thus, the closing control of the exhaust throttle valve 41 may be made in such a deceleration condition accompanied without fuel cut-off. In this case, when the relief valve 43 opens as a result of the increase of exhaust pressure with the closure of the exhaust throttle valve 41, exhaust gas flows through the relief passage 42, removing contaminants adhered to the relief valve 43. Thus, some contaminant removing effect can be achieved by means of exhaust flow, but it is less effective than that attained during fuel cut-off since exhaust gas contains components such as condensed water, smoke, etc. A deceleration condition is a condition in which the engine output is to be reduced to give a deceleration force. Thus, a reduced output at deceleration due to an increased exhaust resistance with the closure of the exhaust throttle valve 41 meets the just-mentioned requirement for deceleration, and does not cause problems of deteriorated fuel consumption. Consequently, the closing control of the exhaust throttle valve 41 at deceleration without fuel cut-off makes it possible to remove contaminants without making fuel consumption worsened.

In the embodiment, the target opening of the throttle valve 14 is corrected to the opening side when the exhaust throttle valve 41 is closed, to thereby cancel the increase in engine load. However, it is not inevitably necessary to carry out such correction for the throttle valve 14, and accordingly, the process of step S22 may be omitted.

What is claimed is:

1. An exhaust purifying apparatus of an internal combustion engine, comprising:

an exhaust throttle valve provided in an exhaust passage of the internal combustion engine, so as to be able to be closed to close the exhaust passage;

a relief passage provided communicating with the exhaust passage and bypassing said exhaust throttle valve;

a relief valve provided in said relief passage so as to be able to be closed to close said relief passage, and arranged to be opened to open said relief passage when receiving an increased pressure in the exhaust passage that is closed with closure of said exhaust throttle valve;

fuel cut determining means for determining whether the internal combustion engine is during fuel cut-off; and a relief-valve forcibly operating means for closing said exhaust throttle valve to open said relief valve when it is determined by said fuel cut determining means that the internal combustion engine is during fuel cut-off.

2. The exhaust purifying apparatus according to claim 1, wherein said exhaust throttle valve is rotatably driven between a fully opened position and a fully closed position, to thereby open and close the exhaust passage.

3. The exhaust purifying apparatus according to claim 1, wherein said relief valve maintains the pressure in the exhaust passage to be equal to or less than a predetermined pressure.

4. The exhaust purifying apparatus according to claim 1, wherein said fuel cut determining means determines whether the internal combustion engine is during fuel cut-off in deceleration, and said relief-valve forcibly operating means closes said exhaust throttle valve when said fuel cut determining means determines that the internal combustion engine is during fuel cut-of in deceleration.

5. The exhaust purifying apparatus according to claim 1, further comprising:

an exhaust purifying catalyst provided in the exhaust passage;

wherein said relief-valve forcibly operating means closes said exhaust throttle valve when an earlier activation of said exhaust purifying catalyst is performed in a state where the internal combustion engine is cold, in addition to when said fuel cut determining means determines that the internal combustion engine is during fuel cut-off.

6. The exhaust purifying apparatus according to claim 1, further comprising:

an exhaust purifying catalyst provided in the exhaust passage;

wherein said relief-valve forcibly operating means closes said exhaust throttle valve when a purging of absorbed substances absorbed by said exhaust purifying catalyst is performed, in addition to when said fuel cut determining means determines that the internal combustion engine is during fuel cut-off.

7. The exhaust purifying apparatus according to claim 1, further comprising:

a filter provided in the exhaust passage;

wherein said relief-valve forcibly operating means closes said exhaust throttle valve when a burning of particulates collected by said filter is performed to remove the particulates, in addition to when said fuel cut determining means determines that the internal combustion engine is during fuel cut-off.

8. The exhaust purifying apparatus according to claim 1, further comprising:

an adhesion-amount-related value estimating means for estimating an adhesion-amount-related value that correlates with an adhesion amount of contaminants to said relief valve;

wherein said relief-valve forcibly operating means closes said exhaust throttle valve when the adhesion-amount-related value that is estimated by said adhesion-amount-related value estimating means exceeds a predetermined value and at the same time when said fuel cut determining means determines that the internal combustion engine is during fuel cut-off.

9. The exhaust purifying apparatus according to claim 8, wherein said adhesion-amount-related value estimating means estimates the adhesion-amount-related value in accordance with a time elapsing from when the adhesion-amount-related value was reset, and a time period during which said exhaust throttle valve is closed since the adhesion-amount-related value was reset.

10. The exhaust purifying apparatus according to claim 1, further comprising:

an intake air amount increasing means for increasing an intake air amount of the internal combustion engine;

wherein said relief-valve forcibly operating means closes said exhaust throttle valve, and operates said intake air amount increasing means to increase the intake air amount of the internal combustion engine in accordance with increase in exhaust resistance as a result of the closure of said exhaust throttle valve.

11. An exhaust purifying apparatus of an internal combustion engine, comprising:

an exhaust throttle valve provided in an exhaust passage of the internal combustion engine, so as to be able to be closed to close the exhaust passage;

a relief passage provided communicating with the exhaust passage and bypassing said exhaust throttle valve;

a relief valve provided in said relief passage so as to be able to be closed to close said relief passage, and arranged to be open to open said relief passage when receiving an increased pressure in the exhaust passage that is closed with closure of said exhaust throttle valve;

deceleration determining means for determining whether the internal combustion engine is during deceleration; and a relief-valve forcibly operating means for closing said exhaust throttle valve to open said relief valve when it is determined by said deceleration determining means that the internal combustion engine is during deceleration.

12. A failure prevention method for an exhaust purifying apparatus of an internal combustion engine, comprising the steps of:

(a) determining whether or not the internal combustion engine is during fuel cut-off or deceleration; and (b) closing an exhaust throttle valve so as to cause a relief valve to open when it is determined at said step (a) that the internal combustion engine is during fuel cutoff or deceleration, the exhaust throttle valve being provided in an exhaust passage of the internal combustion engine for closing the exhaust passage to increase a pressure in the exhaust passage, and the relief valve being provided to be able to close a relief passage that is provided communicating with the exhaust passage and bypassing the exhaust throttle valve.

* * * * *